INVENTOR
ALBERT RUSSELL VAN CORTLANDT WARRINGTON

United States Patent Office 3,512,046
Patented May 12, 1970

3,512,046
POLYPHASE PROTECTIVE RELAYS EMPLOYING A PHASE SEQUENCE DISCRIMINATOR TO DETECT FAULT CONDITIONS
Albert Russell van Cortlandt Warrington, Stafford, England, assignor to The English Electric Company Limited, London, England, a British company
Filed Jan. 25, 1967, Ser. No. 611,731
Claims priority, application Great Britain, Jan. 26, 1966, 3,579/66
Int. Cl. H02h 3/28, 3/38
U.S. Cl. 317—28        3 Claims

ABSTRACT OF THE DISCLOSURE

A polyphase protective relay operative either as a distance relay or a differential relay; (a) the distance relay having current and voltage transformers provided to develop signals dependent respectively on the phase currents and the phase voltages occurring in a protected circuit, control means, including a replica impedance of this circuit, being provided to receive and combine corresponding ones of these signals and to cause the phase of the combined signals to differ from a predetermined reference sequence upon a fault developing in the protected circuit. A phase discriminator is provided to determine the sequence of these signals and is adapted to effect a protective function upon this sequence differing from the reference; (b) the differential relay operates in the same manner except that only current transformers are employed and these are disposed on opposite sides of the protected circuit.

---

This invention relates to polyphase protective relays.

From one aspect, the present invention consists in a polyphase protective relay comprising first sensing means for developing signals respectively dependent on the phase currents flowing at a first position in a protected circuit, second sensing means for developing signals respectively dependent on a selected electrical quantity at a second position, control means for receiving and combining corresponding ones of said signals and operable to cause the combined signals to differ from a predetermined sequence upon a fault developing in said protected circuit, and a phase sequence discriminator for determining the phase sequence of said signals and adapted to effect a protective function upon the sequence thereof differing from said predetermined sequence.

The relay may be a distance relay having a directional-impedance characteristic, the first and second sensing means being current and voltage transformers, respectively, and the control means comprising a transactor and a parallel-connected resistor together providing a replica impedance of the protected circuit.

Alternatively, the relay may be a differential relay, both the first and second sensing means being current transformers disposed on opposite sides of the protected circuit. In this embodiment, the control means may include first and second transactors, the primary winding of the first transactor being connected in series with the two current transformers in its associated phase and having a secondary winding connected to the winding of the second transactor which in turn is connected to a centre tapping on the primary and lies in parallel with the two transformers, whereby to conduct any differential current which exists between these transformers. Thus, the voltage developed across the secondary winding of the first transactor and that developed across the winding of the second transactor constitute the combined signals to which reference has been made.

Figure 1:
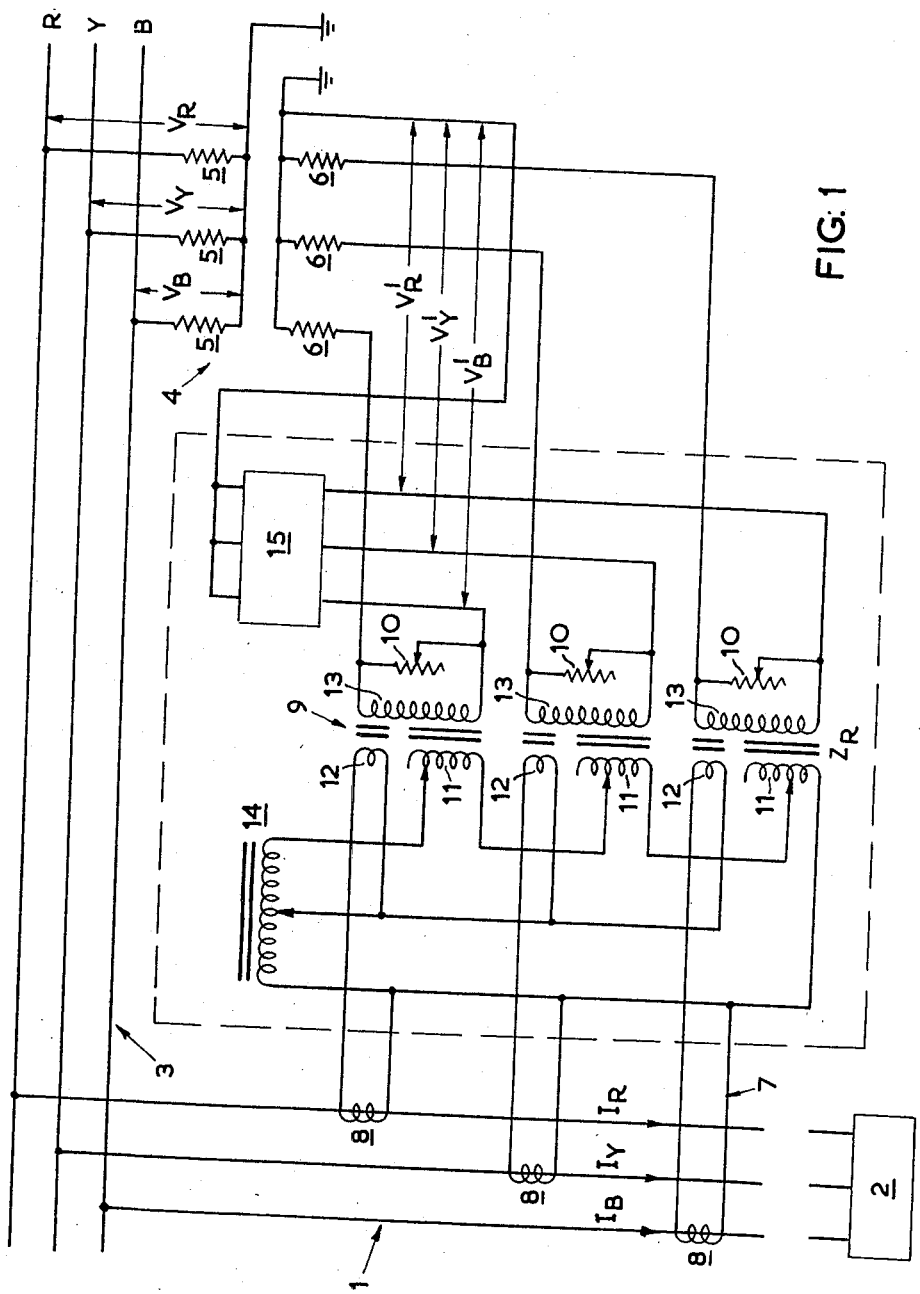
Figure 2A:
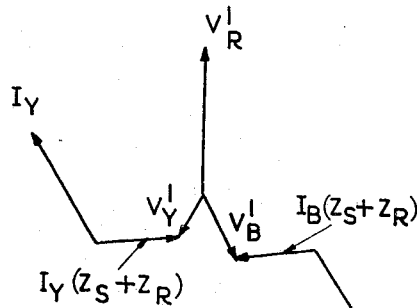
Figure 5:
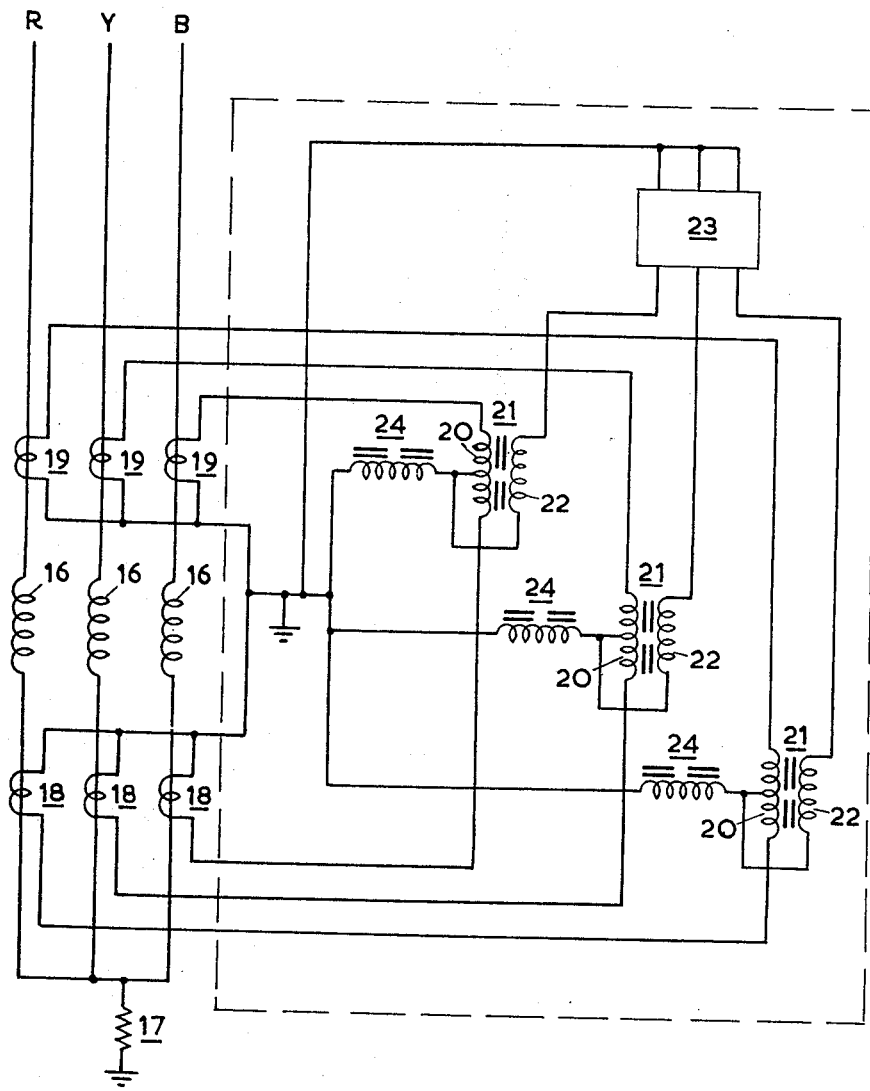

In order that the invention may be fully understood, two embodiments thereof will now be described with reference to the accompanying drawings in which:

FIG. 1 schematically illustrates a polyphase distance relay of the directional-impedance type, e.g. a relay whose impedance characteristic is a mho circle, employing a phase-sequence discriminator;

FIGS. 2(a) and (b), 3(a) and (b) and 4(a) and (b) illustrate vector diagrams of various fault conditions between which the relay in FIG. 1 will discriminate;

FIG. 5 illustrates a polyphase differential relay employing a phase sequence discriminator; and FIGS. 6(a) to (c) and 7(a) to (c) illustrate vector diagrams of various fault conditions between which the relay in FIG. 5 will discriminate.

Referring now to FIG. 1, a three-phase line 1 is connected to a load 2 and has its three lines R, Y and B connected to corresponding lines in a busbar system 3 receiving a three phase supply. Three potential transformers 4 have their primary windings 5 connected in star to the three lines in the busbar 3 for developing on their secondary windings 6 voltages proportional to the phase voltages of the supply, and three current transformers 7 have their secondary windings 8 coupled separately to the three lines 1.

In the relay itself, three transactors 9 together with three adjustable resistors 10 each provide a replica impedance $Z_R$ of the protected section of the line feeding the load, that is, the impedance of the line between the current transformers and the extreme end of the protected section. Each transactor 9 has two primary windings 11, 12 and a single secondary winding 13.

On the primary side, one end of each winding 8 of the current transformer is connected in common to a star point and similarly one end of each winding 12 of the transactor is connected in common to a star point, the other ends of the windings 8 being connected to the other ends of the corresponding windings 12. In turn, the windings 11 each have an adjustable tapping and they are connected together in series across the winding of an auto-transformer 14, the star point of the windings 8 being connected to one end of this winding and the star point of the windings 12 being connected to a tapping on this winding.

On the secondary side of the transactors, each of the three secondary windings 13 is bridged by one of the resistors 10, and is connected in series with a corresponding secondary winding 6 of the potential transformer 4 and separately connected to a phase sequence discriminator 15.

In operation, a current proportional to that flowing in each of the lines 1 is developed in the secondary windings 8 of the current transformers and fed to the transactors 9 so that a voltage is developed across the secondary windings 13. This voltage however, is modified by the auto-transformer 14 which functions to effect zero sequence compensation of the current flowing through this replica impedance $Z_R$. More particularly, this auto-transformer provides the relay with an adjustable proportion of the zero phase sequence components of current ($I_0$) given by $$(Z_0-Z_1)/Z_1=K$$

where:

$Z_0$=zero sequence impedance
$Z_1$=positive sequence impedance.

Accordingly, the voltage developed across the secondary winding 13 of the transactors 9 for the red phase, for example, is given by $$(I_R+KI_0)Z_R$$

and thus the compensated voltage $V'_R$ developed across the discriminator 15 is given by $$V_R-(I_R+KI_0)Z_R$$

and similar expressions obtain for $V'_Y$ and $V'_B$. Since zero phase sequence components of current are only manifested as a result of a ground fault this expression reduces to $$V_R - I_R Z_R$$

for phase-to-phase faults.

The discriminator 15 is operative to detect the phase-sequence and, with reference to FIGS. 2(a) and (b) and 3(a) and (b), it will be seen that the normal phase sequence RYB changes as a result of faults occurring within the protected section of line, but not as a result of faults outside the protected section, the sign of the expression $$V - I Z_R$$

for the appropriate phases changing at the limit of the protected section.

In referring to these figures, the line impedance to the source ($Z_S$) has also been taken into account since of course the fault current is supplied from the source.

In FIG. 2(a) there is shown a vector diagram of typical conditions which exist as a result of a fault between the yellow and blue phases outside the limit of the protected section. In this event, whereas the magnitudes of $V_Y$ and $V_B$ are reduced their phase displacements relative to the healthy phase (red) is not such as to alter the phase sequence RYB and the discriminator 15 will not trip its contacts.

Figure 2B:
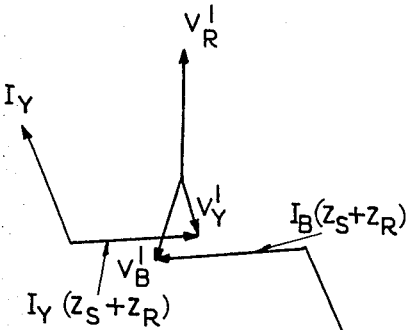

With a fault inside the protected section however, as indicated in FIG. 2(b), the phase displacements relative to the healthy phase is such as to alter the phase sequence to RBY and accordingly the discriminator 15 will trip its contacts and effect protective action.

Figure 3A:
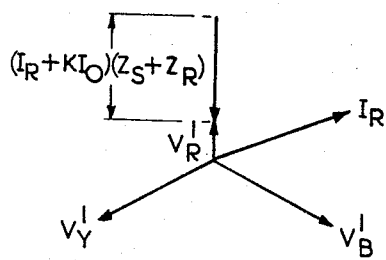
Figure 3B:
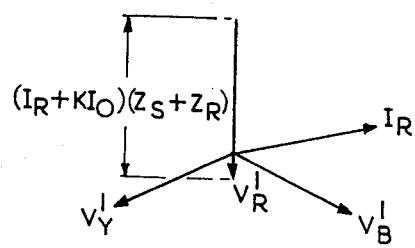

In FIGS. 3(a) and (b) there are shown vector diagrams of typical conditions which exist as a result of a ground fault affecting the red phase only in a solidly grounded system. In FIG. 3(a) the fault is outside the limit of the protected section and whereas $V_R$ is reduced in magnitude the phase sequence RYB is unaffected and the discriminator contacts will not trip. In FIG. 3(b), on the other hand, the voltage drop $(I_R + KI_0)(Z_S + Z_R)$ exceeds the phase-to-neutral voltage $V_R$, the phase sequence changes to RBY and the discriminator contacts will trip.

Figure 4A:
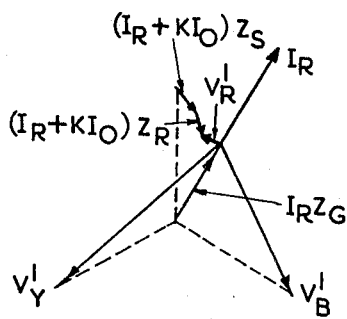
Figure 4B:
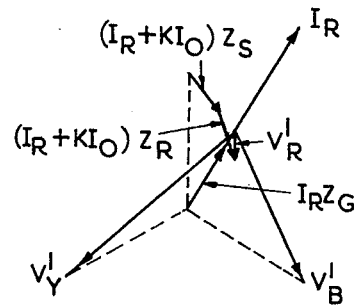

FIGS. 4(a) and 4(b) show vector diagrams of typical conditions existing as a result of a ground fault affecting the red phase only in a system grounded through a resistance $Z_G$. Again, in FIG. 4(a) the fault is outside the limit of the protected section and the discriminator contacts will not trip since the sequence RYB is unaffected whereas, in FIG. 4(b), the fault is inside the section, so that the sequence changes to RBY and the discriminator contacts will trip.

In particular, in a resistance grounded system, the discrimination between normal conditions and single-phase ground faults is improved if the replica impedance $Z_R$ includes a resistance component, since this compensates for the distortion of the Y voltages due to the neutral shifting as a result of the voltage drop across the grounding resistance. In addition, this component also tends to compensate for fault resistance in phase-to-phase faults whilst not interfering with their discrimination.

Referring now to FIG. 5, there is shown a polyphase differential relay for protecting the stator windings of a generator. In particular, the three phase stator windings 16 are connected together in star, the star point being grounded through a resistor 17 for limiting the ground-fault current. Three current transformers have their secondary windings 18 separately coupled to the three phase lines on the grounded side of the stator windings and three further current transformers have their secondary windings 19 separately coupled to the three phase lines on the load side of the stator windings. All the windings 18 and 19 have one side connected to ground and the other side of these windings 18 and 19 associated with the phases R, Y and B are respectively connected in series with the primary windings 20 of three transactors 21. These transactors each have a secondary winding 22 one end of which is separately connected to a phase sequence discriminator 23 and the other end of which is connected to a centre tap on its associated primary winding 20. In turn, each of these centre taps on the three transactors 21 is separately connected to ground through the windings of three auxiliary transactors 24 which are opposed to the secondary windings 22.

In operation, a current proportional to that flowing in the lines on the grounded side of the stator is developed in the secondary windings 18 of the current transformers and a current proportional to that flowing on the load side of the stator is developed in the secondary windings 19. The currents developed by these windings should theoretically be equal in magnitude and direction in the absence of a fault in the stator and accordingly will flow only through the windings 20; the voltages developed across the secondary windings 22 and applied to the phase discriminator 23 will accordingly exhibit the correct phase sequence RYB.

In the event of the stator windings developing a phase-to-phase or phase-to-ground fault, then the currents developed in the appropriate secondary windings 18 and 19 will differ from one another. This difference current will flow through the winding of the transactor 24 associated with each faulty phase, and the winding parameters of the transactors 21 and 24 are such that the phase sequence of the voltage applied to the discriminator will change causing the discriminator contacts to trip and effect protective action.

More particularly, the output of this relay is defined by the expression $$I_S - K' I_D$$

where:

$I_S$ = through current (average value of currents entering and leaving the protected apparatus)
$I_D$ = difference current
$K'$ = ratio of relay sensitivity to $I_S$ and $I_D$.

If the value of $K'$ for a generator be taken as 20, a typical value, then the slope of the operating characteristic, $I_D$ versus $I_S$, is $1/K'$ or 5%. Thus, the discriminator contacts will trip whenever the difference current exceeds 5% of the through current in any phase. This limitation on the percentage of difference current to through current necessary to effect operation is imposed in order to prevent the contacts tripping as a result of heavy external faults, resulting in large through current, which frequently cause spurious differential currents to be developed.

Vector diagrams of typical conditions which exist as a result of an internal stator fault are shown in FIGS. 6(a) to (c) and FIG. 7(a) to (c).

Figure 6A:
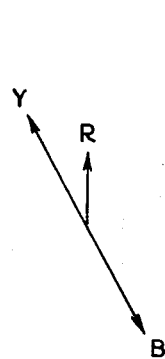
Figure 6B:
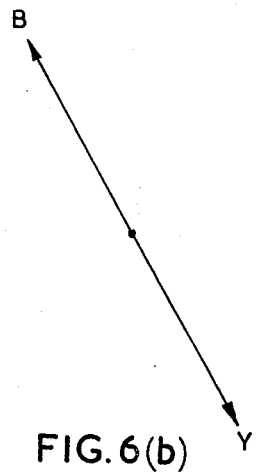
Figure 6C:

Referring now to FIGS. 6(a) to (c) there are shown current vectors which exist as a result of a stator fault between the yellow and blue phases. FIG. 6(a) shows the through currents $I_S$ which are still in the correct sequence RYB, FIG. 6(b) shows the difference currents as a function $-KI_D$, and FIG. 6(c) shows the summation of these terms, namely $I_S - KI_D$, from which it can be seen that the phase sequence has changed to RBY.

Figure 7A:
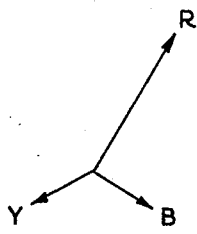
Figure 7B:
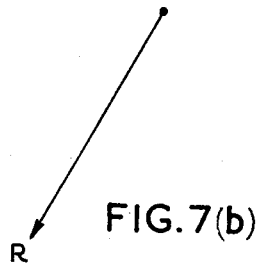
Figure 7C:

In FIGS. 7(a) to (c) there are shown current vectors which exist as a result of a ground fault in the stator affecting the red phase. FIG. 7(a) shows the through currents $I_S$, these still being in the correct phase sequence RYB, FIG. 7(b) shows the difference current $-KI_D$, as before, and FIG. 7(c) shows the resultant $(I_S - KI_D)$ from which it can again be seen that the phase sequence has changed to RBY.

In order to ensure correct operation, the discriminator 23 should impose as low a burden as possible on its input supply so as to ensure that the voltage phase sequence is the same as the current phase sequence.

In addition, it should be ensured that the current in the faulted phase does not lag by more than 60° on ground faults otherwise this could realise a false change in the phase sequence. This presents no difficulty in practice since generators are normally grounded through resistance, but if the generators were solidly grounded, or grounded through reactance, it would be necessary to provide a fault detector in each phase which would shift the current in the faulted phase in the leading direction by an angle approximately equal to the phase angle of the fault current. The same considerations apply if this relay is employed to protect transformer windings.

The phase sequence discriminators 15 and 23 employed in the embodiments in FIGS. 1 and 4 may either be electromagnetic or static. The electromagnetic discriminator may be of the induction cup or disc type, and the static discriminator may employ thermionic valves, semiconductors or ferrite cores and in this case it is to be understood that the "contacts" to which reference has been made may in fact comprise an electronic switching network.

I claim:
1. A polyphase differential relay comprising
   a first current transformer for developing signals respectively dependent on the phase currents flowing on one side of a circuit protected by the relay,
   a second current transformer for developing signals respectively dependent on the phase currents flowing on the other side of the protected circuit,
   control means for receiving and combining corresponding ones of said signals and operable to cause the combined signals to differ from a predetermined sequence upon a fault developing in said circuit, said control means including,
   a first transactor connected in series with the current transformers coupled to the associated phases and
   a second transactor connected to the first transactor and energisable by any difference current flowing through the first transactor, and
   a phase sequence discriminator connected to both the first and second transactors for determining the phase sequence of said signals and adapted to effect a protective function upon the sequence thereof differing from said predetermined sequence.

2. A polyphase distance relay comprising
   first sensing means including
   a voltage transformer for developing signals respectively dependent on the phase voltages occurring in a circuit protected by said relay,
   second sensing means including both
   a current transformer for developing signals respectively dependent on the phase voltages occurring in said circuit, and
   an auto-transformer operative to compensate for zero sequence components of current in said circuit,
   control means, including a replica impedance of the protected circuit for receiving and combining corresponding ones of said signals and operative to cause the phase of the combined signals to differ from a predetermined sequence upon a fault developing in said protected circuit, and
   a phase sequence discriminator for determining the phase sequence of said signals and adapted to effect a protective function upon the sequence thereof differing from said predetermined sequence.

3. A polyphase distance relay according to claim 2, wherein the replica impedance includes
   transactor, and
   a resistor parallel-connected with said transactor, the impedance of these two components together providing a replica of the impedance of the protected circuit.

References Cited

UNITED STATES PATENTS

| 3,176,190 | 3/1965 | Hodges | 317—28 |
| 3,192,442 | 6/1965 | Warrington et al. | 317—47 X |
| 3,374,399 | 3/1968 | Dewey | 317—47 X |
| 3,378,728 | 4/1968 | Humpage et al. | 317—36 |
| 3,379,934 | 4/1968 | Hoel et al. | 317—47 X |

LEE T. HIX, Primary Examiner

J. D. TRAMMELL, Assistant Examiner

U.S. Cl. X.R.

317—36, 47